US006501755B1

United States Patent
McAllister et al.

(10) Patent No.: US 6,501,755 B1
(45) Date of Patent: Dec. 31, 2002

(54) STACKED ADDRESS TRANSPORT IN CONNECTION ORIENTED NETWORKS

(75) Inventors: Shawn McAllister, Kanata (CA); Joel Halpern, Herndon, VA (US); Scott Brim, Ithaca, NY (US)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/111,255

(22) Filed: Jun. 11, 1998

(51) Int. Cl.$^7$ .............................................. H04L 12/28
(52) U.S. Cl. ...................................... 370/392; 370/410
(58) Field of Search .............................. 370/395.1, 396, 370/397, 399, 395.2, 395.31, 395.5, 395.51, 395.52, 395.54, 400, 410, 426, 466, 467, 389, 392, 401

(56) References Cited

U.S. PATENT DOCUMENTS

| | | | | |
|---|---|---|---|---|
| 5,781,529 A | * | 7/1998 | Liang et al. ................. | 370/218 |
| 5,831,982 A | * | 11/1998 | Hummel ...................... | 370/351 |
| 6,078,586 A | * | 6/2000 | Dugan et al. ............... | 370/254 |
| 6,192,043 B1 | * | 2/2001 | Rochberger ................. | 370/238 |
| 6,243,383 B1 | * | 6/2001 | Li et al. ..................... | 370/395.6 |
| 6,272,139 B1 | * | 8/2001 | Soncodi .................... | 370/241.1 |

OTHER PUBLICATIONS

ATM Forum Technical Committee "User–Network Interface ("UNI") Specification Version 4.0" dated Jul. 1996.
D. Provan, "Tunelling IPX Traffic trhough Networks", Internet Engineering Task Force, Document No. RFC 1234, Jun. 1, 1991.
W. Simpson, "IP in IP Tunnelling", Internet Engineering Task Force, Document No. RFC 1853, Oct. 1995.
ATM Forum Technical Committee "Private Network–Network Interface Specification Version 1.0", Document No. af–pnni–0055.00, Mar. 1996.
ITU–T "B–ISDN Application Protocols for Access Signalling", Recommendation Q.2931, Feb. 1995.

* cited by examiner

*Primary Examiner*—Chau Nguyen
*Assistant Examiner*—Andy Lee
(74) *Attorney, Agent, or Firm*—Alfred A. Mecchione; Blake Cassels & Graydon LLP (57) ABSTRACT

There is provided a method of signalling a message using a terminal address across multiple network entities. At least two contiguous network entities are associated with addressing spaces for which message addresses are not routable by way of the terminal address and are not otherwise routable by way of a single address. At every network border between any two contiguous network entities wherein an immediately succeeding network entity does not provide an addressing space through which the message is routable, it is determined whether the party number is to be stored and replaced with a new party number. If so, the party number is stored so as to permit its subsequent retrieval according to a last-in and first-out precedence to thereby create a stored party number. Once the party number has been stored, a replacement address is assigned as the party number. Also at every such border, it is determined whether the party number is to be discarded and replaced with a stored party number. If so, the last-in stored party number is assigned as the party number. The message is then routed according to the party number and, with the message, every stored party number is transported through the immediately succeeding intermediate network entity and through each further succeeding and contiguous intermediate network entity, if any, through which the message is routable.

42 Claims, 5 Drawing Sheets

STACKED ADDRESS TRANSPORT IN CONNECTION ORIENTED NETWORKS

FIELD OF THE INVENTION

The present invention relates generally to the field of connection oriented communications networks and more particularly, to a method for stacked address transport in such networks.

According to preferred embodiments, the invention relates to the signalling of network messages across multiple network entities through which message addresses are not routable. Such signalling is accomplished by transporting, together with a terminal address, all locally routable addresses associated with the various network entities through which the message is to be transported. In other preferred embodiments of this invention, a method is described for the encapsulation and transport of multiple message addresses within a call set up message which employs a message address stack for that purpose. According to this particular preferred embodiment, the method is adaptable to Asynchronous Transfer Mode ("ATM") network devices which can "PNNI" network protocols, namely Private Network-Network Interface and Private Network Node Interface signalling and routing protocols.

BACKGROUND OF THE INVENTION

Recent technological, economic and regulatory trends in the fields of telephony and data communications have resulted in the need for enhanced network interoperability. Where internetworking is to take place among connection oriented networks which operate using different addressing schemes, for instance a plurality of networks comprised of interconnected private networks or service provider networks, special techniques must usually be deployed in order for a message sent from the originating end system to properly route via the intermediate networks to the destination end system. Traditionally, network interoperability has been achieved by the use of routing tables, to support address relocation across different intermediate network boundaries.

Signalling in connection oriented networks is the process of establishing, maintaining and releasing a message connection through the exchange of connection establishment request and connection establishment acknowledgement messages through the network nodes along a given message path. For signalling purposes, each network node device in a given network may be associated with a routing table or the like which provides internal addressing information for all of the destination addresses that are employed by each of the network users. Generally, it is important to maintain routing tables which are relatively compact in size, in that limited memory may be available to each particular network node device for storage of its associated routing table. In any event, and as explained below, if the routing table must grow substantially as users are added or as the network grows, then this results in complexity which limits the size of the network which can be effectively attained.

Where destination addresses are aggregatable or topologically assigned, such that all addresses which are topologically related to each other can be summarized to a small number of addresses that are typically leading digits or prefixes (for example, addresses which are accessed off the same node), the routing table associated with each of the network node devices of the intermediate networks may be maintained to a manageable size. This is because the network node devices within the intermediate networks can advantageously employ prefix-based routing. However, with the advent of applications in telephony such as local number portability, mobility and customer owned addresses, the size and complexity of routing tables can be expected to increase as more addresses lose their topological significance. Where addresses are no longer assigned topologically, conventional switching systems may no longer scale well to larger and larger address spaces as the number of interworked networks which must be addressed is ever increased. This results from the fact that it would be necessary in such circumstances to have a routing table entry for every destination network node device on the interworked network space.

There are also instances where a given intermediate network, according to current standards and practices, may be unable or unwilling to route directly using the address spaces of other interworked networks. These instances include the implementation of Virtual Private Networks ("VPNs"), the incorporation and management of networks whose address spaces have been structured without considering the addressing scheme of the intermediate network, and the need in a given networking space to support location management for mobile end-user devices. As well, another example which may result in similar addressing problems for an intermediate network occurs in the context of topological reorganization of the address spaces of networks to which the intermediate network is connected. Yet another example involves situations where the addresses used by the networks connected to the intermediate network are not globally unique as is often the case for the previously mentioned VPNs.

As one technique for achieving some degree of network interoperability, it has been known to transport a message address between two networks where it may be used, across a single network where the message address cannot be used. This technique is sometimes known to those skilled in this art as tunnelling or tunnelled signalling. Typically, in tunnelled signalling, a signalling message employs an endpoint message address which is of routing significance to both the originating and destination interworked networks. Prior to a signalling message arriving at the ingress node of the intermediate network through which the signalling message is to be routed, the endpoint address is encapsulated in the signalling message and is thereafter routed to the appropriate egress node of the intermediate network via an intermediate address which is of routing significance to the intermediate network. Upon emerging from the egress node of the intermediate network, for instance at the ingress node of the destination network, the signalling message reverts to the use of the original endpoint message address which retains its routing significance to the destination network. Thus, this signalling technique is known as "tunnelling" since the intermediate network is unaware of the originating and endpoint destination addresses. The intermediate network merely routes these external addresses transparently.

In current ATM signalling standards, various mechanisms for tunnelling have been specified. For instance, such mechanisms are found in the ATM User-Network Interface ("UNI") Specification Versions 2.0, 3.0 and 4.0, respectively dated June 1992, August 1993 and July 1996, each of which is published by the ATM Forum. These particular standards apply in routing connections between private ATM endpoints identified by NSAP formatted ATM addresses across a public network supporting E. 164 ATM addresses. Tunnelled signalling according to these known standards may be supported by the use of an existing message field or Information Element ("IE") within the message format of a connection establishment request message, for instance a Call SETUP request message. The existing message field in question is known to those skilled in this art as the Called Party Subaddress IE, and this field may be used to store and encapsulate the destination endpoint address to which a message or call is destined to be routed.

By way of example, in signalling a Call SETUP request message, an egress network node device of an intermediate network may temporarily place the destination endpoint address of the called party, also known as the Called Party Number, into the Called Party Subaddress IE of the SETUP request message. That same network node device may then temporarily place the egress endpoint address of the intermediate network into the Called Party Number field of the Call SETUP request message. The Call SETUP request message can thereafter be routed to the egress endpoint address by the intermediate network. When the SETUP request message enters the destination network, the contents of the Called Party Number field, namely the egress endpoint address of the intermediate network, may be discarded. The destination endpoint address is then assigned from the Called Party Subaddress IE to the Called Party Number field. A similar mechanism for tunnelling applies to the originating address, known as the Calling Party Number.

One problem with the foregoing existing solutions for tunnelled signalling is that the substitution of an intermediate network address can only occur once for a given Call SETUP message. Where more than a single intermediate network must be employed to route a message, and those intermediate networks do not share a common addressing space with the originating and destination networks nor with each other, the known tunnelling mechanisms do not permit more than one of such intermediate networks to be traversed. Likewise, where the message addresses associated with the respective address spaces of the intermediate networks are not topologically significant outside of each such address space, more than one intermediate network cannot be traversed pursuant to the known tunnelling techniques described above. Another problem with the known tunnelling techniques is that public networks, such as service provider networks, are not permitted to use the Called Party Subaddress IE or Calling Party Subaddress IE for tunnelling purposes according to current standards. As a result, this mechanism cannot be used in a standards complaint manner for local number portability, mobility and customer owned address applications.

In networks which operate according to a connectionless packet switched data technology, for instance those operating pursuant to IP or IPX signalling protocols, tunnelling has been accomplished by encapsulating the original packet in a new packet which comprises an additional header for routing the packet across the space through which tunnelling occurs. The original packet which is encapsulated within the new packet retains the original header together with its payload of application data. Typically, the intermediate network nodes which handle tunnelled IP packets will only make use of the outermost header in routing any packet through a space being tunnelled. Such known methods of tunnelling in IP and IPX networks are found in the following references: D. Provan, "Tunnelling IPX Traffic through IP Networks", Document No. RFC 1234 dated Jun. 1, 1991; and W. Simpson, "IP in IP Tunnelling", Document No. RFC 1853 dated October, 1995, each reference being issued by the Internet Engineering Task Force ("IETF").

Based on the foregoing, there is therefore a need to provide a transport mechanism to permit address tunnelling with multiple levels of mapping in connection oriented networks, namely wherein addresses may tunnel through multiple successive networks having unrelated address spaces. There is also a need to provide such a transport mechanism in a manner that it may be implemented in service provider networks and private networks at the same time and without ambiguity. Lastly, there is a need to provide a mechanism for address tunnelling which may be implemented either at the egress point of the preceding network or at the ingress point of the succeeding network. It is an object of the present invention to attempt to meet these varied needs with a generic transport mechanism which permits different network node addresses to be used across multiple network boundaries, as explained in greater detail below.

SUMMARY OF THE INVENTION

According to a first broad aspect of the present invention, there is provided a method of signalling a message across a plurality of connection oriented network entities. The network entities include an originating network entity, a terminating network entity and at least two of a plurality of intermediate network entities connected successively therebetween. The originating network entity and the terminating network entity each respectively are associated with a terminal address, the terminal address of the originating network entity being a terminal originating address and the terminal address of the terminating network entity being a terminal destination address. At least two contiguous network entities of the connection oriented network entities are associated with addressing spaces through which the message is not routable by way of one of said terminal addresses when same is used as a party number for routing the message and through which the message is not otherwise routable by way of a single address. The message is initiated from the terminal originating address associated with the originating network entity and is routed through the intermediate network entities to be received at the terminal destination address associated with the terminating network entity.

The method of signalling according to the first broad aspect of the invention includes storing said unroutable terminal address as a party number. The message is then-routed according to the party number from the originating network entity through each succeeding and contiguous intermediate network entity, if any, which provides an addressing space through which the message is routable. At every network border between any two contiguous network entities wherein an immediately succeeding network entity does not provide an addressing space through which the message is routable, it is determined whether the party number is to be stored and replaced with a new party number. If so, then the party number is stored so as to permit its subsequent retrieval according to a last-in and first-out precedence to thereby create a stored party number and, once the party number has been stored as aforesaid, a replacement address is assigned as the party number. At every network border between any two contiguous network entities wherein an immediately succeeding network does not provide an addressing space through which the message is routable, it is determined whether the party number is to be discarded and replaced with a stored party number and, if so, the last-in stored party number is assigned as the party number. Following each of said determinations, the message is routed according to the party number and every stored party number is transported, with the message, through the immediately succeeding intermediate network entity and through each further succeeding and contiguous intermediate network entity, if any, through which the message is routable. The foregoing steps are repeated until such time as the message is routable to the terminating network entity according to the party number.

According to a second and a third broad aspect of the present invention, there is provided a method of signalling a message across a plurality of connection oriented network entities. The network entities include an originating network entity, a terminating network entity and a plurality of intermediate network entities connected successively therebetween. The originating network entity and the terminating network entity each are respectively associated with a terminal address. The terminal address of the originating network entity is a terminal originating address and the terminal address of the terminating network entity is a terminal destination address, both of which are selected from a common addressing space. At least two of the intermediate network entities are each associated with addressing spaces that are not topologically significant to each other and that are not topologically significant to the common addressing space from which the terminal originating and terminal destination addresses are selected. The message is initiated from the terminal originating address associated with the originating network entity and routed through the plurality of intermediate network entities to be received at the terminal destination address associated with the terminating network entity.

With reference to the second broad aspect of the present invention, the method of signalling comprises the first step of storing the terminal destination address as a called party number. In the second step, the message is routed according to the called party number from the originating network entity through each succeeding and contiguous intermediate network entity, if any, which shares a topologically significant addressing space with the originating network entity. Thirdly, at every network border between any two contiguous network entities which do not share a topologically significant addressing space with each other, it is determined whether the called party number is to be stored and replaced with a new called party number that is of routing significance to the intermediate network entity which immediately succeeds the border. If so, the called party number is stored so as to permit its subsequent retrieval according to a last-in and first-out precedence to thereby create a stored called party number. Once the called party number has been stored as aforesaid, a local terminal address is assigned as the called party number for progressing the message through the immediately succeeding intermediate network entity. The fourth step also occurs at every border between any two contiguous network entities which do not share a topologically significant addressing space with each other, and involves determining whether the called party number is to be discarded and replaced with a stored called party number, wherein the stored called party number is of routing significance to the intermediate network entity which immediately succeeds the border. If so, the last-in stored called party number is assigned as the called party number for progressing the message through the immediately succeeding intermediate network entity. In the fifth step, the message is routed according to the called party number and, with the message, every stored called party number is transported through the immediately succeeding intermediate network entity and through each further succeeding and contiguous intermediate network entity, if any, which shares a topologically significant addressing space with the immediately succeeding intermediate network entity. The third, fourth and fifth steps are repeated until such time as the message is routable to the terminating network entity according to the called party number.

With reference to the third broad aspect of the present invention, the method of signalling comprises the first step of storing the terminal destination address as a called party number. The second step involves storing the terminal originating address as a calling party number. In the third step, the message is routed according to the called party number from the originating network entity through each succeeding and contiguous intermediate network entity, if any, which shares a topologically significant addressing space with the originating network entity. The fourth step occurs at every network border between any two contiguous network entities which do not share a topologically significant addressing space with each other, determining whether the called party number is to be stored and replaced with a new called party number that is of routing significance to the intermediate network entity which immediately succeeds the border. If so, the called party number and the calling party number are stored so as to permit their subsequent retrieval according to a last-in and first-out precedence to thereby respectively create a stored called party number and a stored calling party number. Once the called party number and the calling party number have been stored as aforesaid, a first local address is assigned as the called party number for progressing the message through the immediately succeeding intermediate network entity and a second local address is assigned as the calling party number. The fifth step occurs at every border between any two contiguous network entities which do not share a topologically significant addressing space with each other, and involves determining whether the called party number is to be discarded and replaced with a stored called party number, wherein the stored called party number is of routing significance to the intermediate network entity which immediately succeeds the border. If so, the last-in stored called party number is assigned as the called party number for progressing the message through the immediately succeeding intermediate network entity and the last-in stored calling party number is assigned as the calling party number. In the sixth step, the message is routed according to the called party number and, with the message, every stored called party number and every stored calling party number are transported through the immediately succeeding intermediate network entity and through each further succeeding and contiguous intermediate entity, if any, which shares a topologically significant addressing space with the immediately succeeding intermediate network entity. The fourth, fifth and sixth steps are repeated until such time as the message is routable to the terminating network entity according to the called party number.

According to a fourth broad aspect of the present invention, there is provided a method for processing a network message associated with a party number according to which the network message is routed and having a message address stack within which at least two addresses may be stored, the method comprising the steps of: (a) reading the party number associated with the network message; (b) determining whether the party number is to be stored and replaced with a new party number and, if so, then storing the party number within the message address stack to permit its subsequent retrieval according to a last-in and first-out precedence to thereby create a stored party number and, once the party number has been stored as aforesaid, assigning a replacement address as the party number; and (c) following step (b), routing the message according to the party number.

According to a fifth broad aspect of the present invention, there is provided a method for processing a network message associated with a party number according to which the message is routed and having a message address stack within which at least two addresses may be stored and retrieved according to a last-in and first-out precedence, the method comprising the steps of: (a) reading the party number associated with the network message; (b) determining whether the party number is to be discarded and replaced with an address stored within the message address stack and, if so, assigning a last-in stored party number of the message address stack as the party number; and (c) following step (b), routing the network message according to the party number.

According to a sixth broad aspect of the present invention, there is provided a network switch for processing a network message associated with a party number according to which the message is routed and having a message address stack within which at least two addresses may be stored and retrieved according to a last-in and first-out precedence, the network switch comprising: (a) means for reading the party number associated with the network message; (b) means for determining whether the party number is to be stored and replaced with a new party number; (c) means for storing the party number within the message address stack to permit its subsequent retrieval according to a last-in and first-out precedence to thereby create a stored party number; (d) means for assigning a replacement address as the party number; and (e) means for routing the message according to the party number once said replacement address has been so assigned.

According to a seventh broad aspect of the present invention, there is provided a network switch for processing a network message associated with a party number according to which the message is routed and having a message address stack within which at least two addresses may be stored and retrieved according to a last-in and first-out precedence, the network switch comprising: (a) means for reading the party number associated with the network message; (b) means for determining whether the party number is to be discarded and replaced with an address stored within the message address stack; (c) means for assigning a last-in stored party number of the message address stack as the party number; and (d) means for routing the message according to the party number once said last-in stored party number has been so assigned as the party number.

BRIEF DESCRIPTION OF THE DRAWINGS

By way of illustration and not of limitation, preferred embodiments of the present invention will next be described, in which.

DETAILED DESCRIPTION OF THE PREFERRED EMBODIMENTS

Call establishment in a connection oriented network, such as an ATM network, typically consists of two operations. The first operation involves the selection of a path for the call and the second operation involves the setup of a connection state at each point along that path. Two basic routing techniques have largely been used in connection oriented networks to date. These are source routing and hop-by-hop routing. In source routing, the originating or source network system selects the routing path to progress to the destination address of the call. In the hop-by-hop routing, on the other hand, each intermediate network system along the call path independently selects the succeeding leg or hop of the call path until the destination address of the call is progressively attained.

The PNNI signalling and routing protocols make use of source routing for all connection setup requests. These PNNI protocols are known to those skilled in this art. The protocols are described in a specification entitled "Private Network-Network Interface Specification Version 1.0", Document No. af-pnni-0055.0000, dated March 1996 and produced by the ATM Forum Technical Committee (the "PNNI specification"), which specification is incorporated herein by reference. The PNNI specification contains procedures to dynamically establish, maintain and clear ATM connections at the Private Network-to-Network Interface or the Private Network Node Interface (PNNI) between two ATM networks or two ATM network nodes.

While the present invention will be described below in relation to a preferred embodiment based on ATM networking and on the PNNI specifications for signalling and routing, those skilled in this art will appreciate that the invention may be adapted to other networking, signalling or routing protocols. For instance, the present invention may be adaptable to forms of addressing such as all number types (or TON's) of E. 164 and X. 121 protocols, private numbering plans and Network Service Access Point (NSAP) protocols. Likewise, the present invention may be adaptable to signalling protocols such as Frame Relay, Narrowband Integrated Services Digital Network (NISDN), Broadband ISDN User Part (BISUP), ATM Interworking Network Interface (AINI) and ITU Standard Q.2931. Moreover, the present invention is adaptable to point-to-point (P2P), point-to-multipoint (P2MP) and multipoint-to-multipoint (MP2MP) connection types as well as to various methods of connection establishment such as root-initiated and leaf-initiated join (LIJ) procedures.

Figure 1:
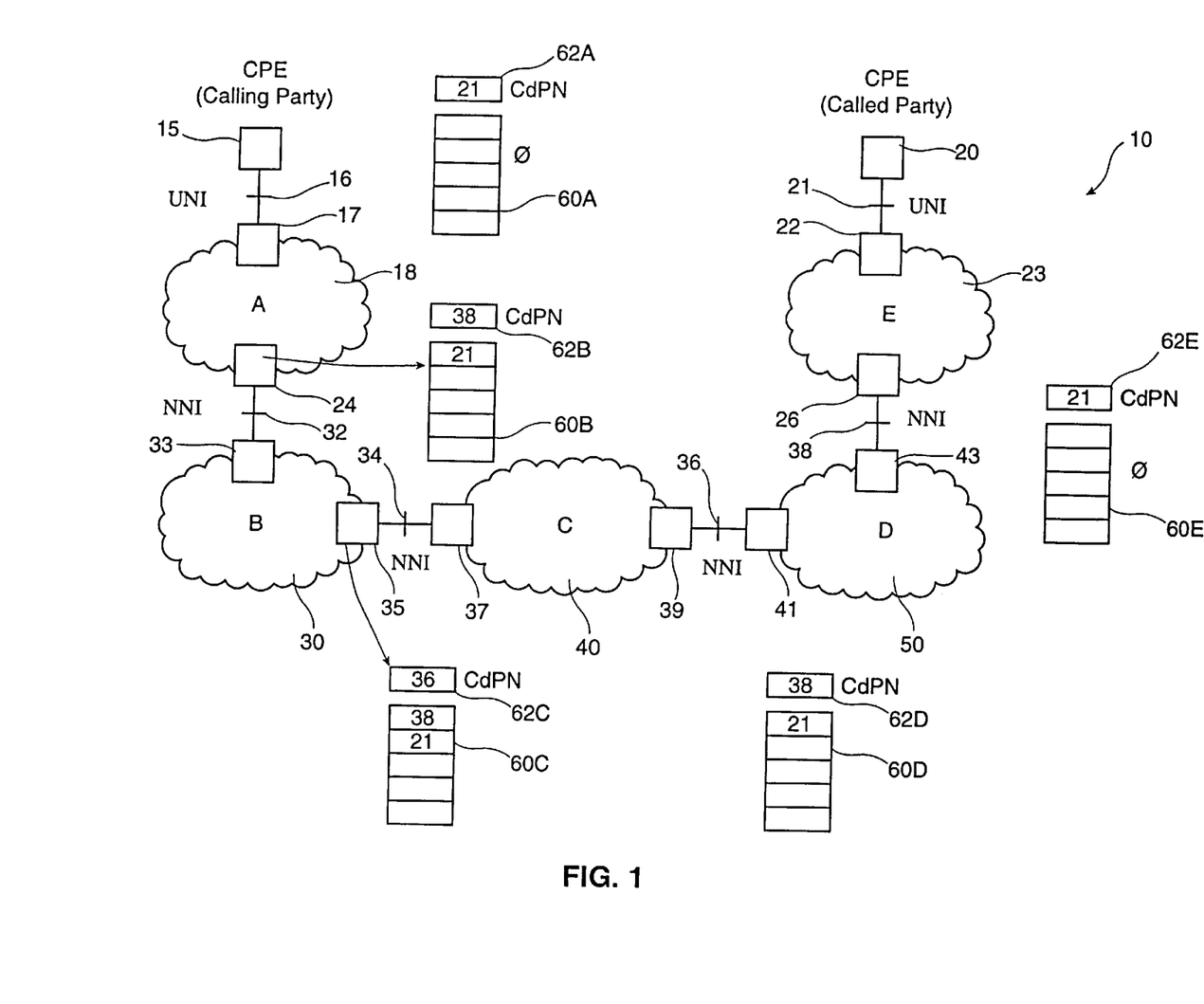
FIG. 1 is a schematic representation of a first ATM networking environment showing the operations of stacking and unstacking of message addresses at network nodes utilizing a transported message address stack according to one preferred embodiment of the present invention.

An exemplary ATM networking environment 10 within which a preferred embodiment of the present invention may be implemented is shown in FIG. 1 as comprising a plurality of network entities. By a network entity is meant a network space comprising a plurality of nodes or an external node, device or element connected thereto. Thus, to name some examples a network entity may be a switch connecting two networks, equipment at customer premises that is connected to a network or some other point of attachment which is connected to a network, as well as signifying a network itself. An originating network entity, such as a calling party having customer premise equipment (CPE) 15, may wish to establish communications with a destination network entity, such as a called party having customer premise equipment (CPE) 20. The CPE 15 and 20 are each connected via respective UNI compliant interfaces 16, 21 to respective intermediate ATM network entities, for instance the ATM networks 18, 23 (labelled A and E). From the perspective of the calling party, Network A provides ingress node 17 for connection to the UNI interface 16, whereas Network B provides egress node 22 for like connection from its corresponding UNI interface 21.

The Networks A and E respectively provide egress node 24 and ingress node 26 for connection to other intermediate network entities, namely ATM networks 30, 40 and 50 (labelled B, C and D) via NNI interfaces 32, 34, 36 and 38 in the manner next described. By way of example, the NNI interface may be generally compliant with the AINI or BISUP protocols well known to those skilled in this art, with certain modifications explained in greater detail below. From the perspective of the calling party, ingress node 33 of Network B is connected to NNI interface 32, which in turn is connected to egress node 24 of Network A. Egress node 35 of Network B is connected to NNI interface 34, which in turn is connected to ingress node 37 of Network C. Network C provides an egress node 39 connected to NNI interface 36, which is itself connected to ingress node 41 of Network D. Lastly, Network D has an egress node 43 which connects to ingress node 26 of Network E, previously described.

In the ATM networking environment 10, the Network A and the Network E both share a common addressing space. By way of example, the originating and destination networks may both be private ATM networks. On the other hand, intermediate Networks B, C and D do not share a common addressing space with Networks A and E, nor do the Networks B, C and D all share a common addressing space together. In other words, at least two of the intermediate networks B, C and D do not share a common addressing space. By way of example, one or more of the intermediate networks may be a service provider network. Alternatively, the Networks B, C and D may have addressing spaces that are otherwise not topologically significant with each other. For instance, the addressing spaces associated with these networks may be common spaces which operate according to the same routing protocol, but for administrative or functional reasons each of the networks may be structured so as not to permit routing with addresses that are of routing significance to the other networks. The situation wherein Networks B and D share a common addressing space, itself different from the common addressing space of Networks A and E, and in each case different from the addressing space of Network C, shall be considered for purposes of illustration.

According to a preferred embodiment of the present invention, an address stack is used to store and transport a sequence of called and calling party numbers which have been mapped to other called and calling party numbers for local routing or other administrative purposes within intermediate networks, such as Networks B, C and D. Such networks may not share the same addressing space as the originating and destination networks for the call being routed, such as Networks A and E. Alternatively, as explained above, the intermediate networks may have addressing spaces that are otherwise not topologically significant to each other. The mapping function itself is well known to those skilled in this art. The basic functionality of an address stack is next described, followed by a preferred implementation of the stack with reference to a Call SETUP message pursuant to the PNNI specification. For the reasons explained below, the address stack is preferably configured as a last-in first-out (LIFO) stack. That is, any address placed on the stack must be removed from the stack before any other address placed on it previously and after any address placed on it subsequently.

With reference to FIG. 1, the calling party at CPE 15 launches a call to the called party at CPE 20. At call initiation, the called party address stack 60A is empty. The Called Party Number 62A is represented by the external destination address for the called party. A call establishment request message, such as a Call SETUP message, is signalled from CPE 15 using an external destination address for CPE 20 of the called party as the Called Party Number. This external destination address will correspond to the network address for UNI link 21 of Network E. Since the Networks A and E share a common addressing space, the Call SETUP message will be routed by Network A to its egress node 24. In the case of a PNNI compliant network, the call will progress through the network by means of DTL routing, as is known to those skilled in this art and as described in greater detail herebelow. Where Network A is a PNNI network, information is configured at egress node 24 to signify that address 21 can be reached out of NNI link 32. This information is then flooded according to the PNNI protocol to all of the nodes of Network A, including ingress node 17. The latter node is thus provided with information for routing calls that it receives which are destined to address 21 via NNI link 32.

The original Called Party Number is only of routing significance to Networks A and E. Thus, at the network border between Networks A and B, for instance at egress node 24 of Network A, an address routing table or an address translation table will map the external destination address for UNI link 21 of Network E to that of an intermediate destination address or local address corresponding to NNI link 38 of Networks D and E. By a local address is meant an address of routing significance to a succeeding network entity, at a network border which, in the case of the succeeding network entity being a network, will indicate the exit point of that network. The address routing table or address translation table mentioned above may be proximate to, or locally accessed by, the node which has been configured to perform address mapping. Alternatively, the tables used for address mapping may be accessed remotely. At this point in the progression of the call, the original Called Party Number is assigned to the called party address stack, as at 60B. The intermediate destination address for NNI link 38 of Network D is assigned to the Called Party Number, as at 62B. The call proceeds to the succeeding network, namely Network B via its ingress node 33. Since intermediate Networks B and D share the same addressing space, the intermediate destination address or local address of NNI link 38 will be of routing significance to Network B, such that the Call SETUP message will be routed to egress node 35 of Network B.

At the network border between Networks B and C, for instance at egress node 35 of Network B, the intermediate destination address for NNI link 38 of Networks D and E is mapped to that of another intermediate destination address or local address corresponding to NNI link 36 of intermediate Networks C and D. This is because Network C, on the one hand, and Networks B and D, on the other hand, do not share a common addressing space. The current Called Party Number 62B, corresponding to the intermediate destination address for NNI link 38 of Networks D and E, is pushed onto the called party address stack as at 60C. The intermediate destination address corresponding to NNI link 36 of Networks C and D is assigned to the Called Party Number, as at 62C. The call proceeds through Network C to its egress node 39.

At the network border between Networks C and D, for instance at ingress node 41 of intermediate Network D, the ingress node 41 may be configured to "pop" the address stack upon receiving the address for the NNI link 36 of Networks C and D as the Called Party Number. Namely, the ingress node 41 operates to assign the last-in element of the called party address stack to the Called Party Number as at 62D, thereby discarding the address for NNI link 36 of Networks C and D. The remaining elements of the address stack, in this case the sole address corresponding to the terminal destination address for UNI link 21 of Network E, is promoted within the stack to the last-in element, as at 60D. The call proceeds through intermediate Network D to its egress node 43.

At the network border between Networks D and E, for instance at ingress node 26 of destination Network E, the ingress node 26 may be configured to promote the last-in element of the called party address stack in the manner previously described upon receiving the address for the NNI link 38 of Networks D and E as the Called Party Number. The result is that the called party address stack will be empty, as at 60E, and the terminal destination address of UNI link 21 of destination Network E will be assigned from the last-in element of the called party address stack to the Called Party Number, as at 62E. The call will thereafter be routed through destination Network E to egress node 22 thereof and on to UNI link 21 which denotes the called party, CPE 20.

While what has been described above pertains to the stacking and transport of Called Party Numbers, those skilled in this art will appreciate that a similar stacking and transport mechanism may be employed for Calling Party Numbers, by using a calling party address stack either alone or in combination with the described mechanism for Called Party Numbers.

The preferred structure and contents of a PNNI based Call SETUP message for implementing the foregoing embodiment of the present invention will next be described. According to the PNNI signalling protocol, a Call SETUP message is sent by the preceding network to the succeeding network to initiate a call and establish a connection therefor. The Call SETUP message has a global significance, in that it is relevant for routing purposes at the local PNNI network domain, at that of other PNNI network domains and at UNI interfaces related to the call. In PNNI signalling, the entry node in a peer group of network nodes generally specifies the entire path across that peer group. The path is encoded and recorded as a list of node identifiers, and optionally of link identifiers, that completely specify the path. This node and link identifier list is known to those skilled in this art as a designated transit list ("DTL"), previously mentioned. The DTL is included as part of each call connection setup request. Typically, a sequence of DTL lists that are organized as a stack will represent the messaging route across a complete PNNI network domain.

The known contents of the PNNI Call SETUP message are described in the table and accompanying footnotes which immediately follow. Each Information Element described in the first column of the table is to be understood according to the codeset 0 standardized ITU-T format. In the column labelled "Reference", the relevant section of the previously mentioned PNNI specification is provided. In the column labelled "Type", it is indicated whether the inclusion of the particular information element is mandatory ("M") or optional ("O"). The last column of the table provides the length of the particular Information Element, or a permissible range of lengths, in octets.

| Information Element | Reference | Type | Length |
| --- | --- | --- | --- |
| Protocol discriminator | 6.4.2 | M | 1 |
| Call reference | 6.4.3 | M | 4 |
| Message type | 6.4.4.1 | M | 2 |
| Message length | 6.4.4.2 | M | 2 |
| AAL parameters | 6.4.5.8 | $O^{(1)}$ | 4–21 |
| ABR additional parameters | 6.4.5.5 | $O^{(1)}$ | 4–14 |
| ABR setup parameters | 6.4.5.6 | $O^{(11)}$ | 4–36 |
| Alternative ATM traffic descriptor | 6.4.5.7 | $O^{(12)}$ | 4–30 |
| ATM traffic descriptor | 6.4.5.9 | M | 12–30 |
| Broadband bearer capability | 6.4.5.10 | M | 6–7 |
| Broadband high layer information | 6.4.5.11 | $O^{(1)}$ | 4–13 |
| Broadband repeat indicator | 6.4.5.13 | $O^{(6)}$ | 4–5 |
| Broadband low layer information | 6.4.5.12 | $O^{(1)}$ | 4–17 |
| Called party number | 6.4.5.15 | M | (2) |
| Called party soft PVPC or PVCC | 6.4.6.2 | $O^{(4)}$ | 4–11 |
| Called party subaddress | 6.4.5.16 | $O^{(1)}$ | 4–25 |
| Calling party number | 6.4.5.17 | $O^{(1)}$ | 4–26 |
| Calling party soft PVPC or PVCC | 6.4.6.1 | $O^{(3)}$ | 4–10 |
| Calling party subaddress | 6.4.5.18 | $O^{(1)}$ | 4–25 |
| Connection identifier | 6.4.5.22 | $O^{(5)}$ | 4–9 |
| Connection scope selection | 6.4.5.23 | $O^{(1)}$ | 4–6 |
| Designated transit list (DTL) | 6.4.6.4 | $M^{(7)}$ | 33–546 |
| Endpoint reference | 6.4.8.1 | $O^{(1)}$ | 4–7 |
| End-to-end transit delay | 6.4.5.24 | $O^{(8)}$ | 4–13 |
| Extended QoS parameters | 6.4.5.25 | $O^{(10)}$ | 4–25 |
| Generic identifier transport | 6.4.5.31 | $O^{(1,9)}$ | 4–33 |
| Minimum acceptable ATM traffic descriptor | 6.4.5.26 | $O^{(12)}$ | 4–20 |
| Notification indicator | 6.4.5.27 | $O^{(1)}$ | 4–* |
| QoS parameter | 6.4.5.28 | $O^{(1)}$ | 4–6 |
| Transit network selection | 6.4.5.30 | $O^{(1)}$ | 4–9 |

[1] This Information Element is included if the received setup indication contains this information.
[2] The denoted minimum length depends on the numbering plan employed. The maximum length is 25 octets.
[3] This Information Element may be included in case of soft PVPC or PVCC setup, when the calling endpoint wants to inform the destination network interface of the values used for the PVPC or PVCC segment at the calling end.
[4] This Information Element is included in case of soft PVPC or PVCC setup.
[5] This Information Element is included when preceding side wants to indicate a specific virtual path or virtual channel. If not included, its absence is interpreted as signifying the virtual path or virtual channel is acceptable. This Information Element may only be absent when using the non-associated signalling procedures.
[6] When the Broadband repeat indicator Information Element immediately precedes the DTL Information Element, it indicates the order of designated transit list Information Elements in the DTL stack. This Information Element is mandatory, even when there is only one designated transit list Information Element. When the Broadband repeat indicator Information Element immediately precedes any other Information Element, it is included if the received setup indicationcontains this information.
[7] This Information Element is included by the source node to indicate the hierarchical source route for the call. Included by the node at the entry to a hierarchical level to indicate the path through that hierarchical level. This Information Element may be repeated up to 10 times.
[8] This Information Element is included to specify an end-to-end transit delay requirement.
[9] This Information Element may be present up to three times.
[10] This Information Element is included to specify individual QoS parameter requirements for the call.
[11] This Information Element is mandatory if the calling user requested an ABR traffic category connection.
[12] This Information Element is only present when transit network selection information is present in the received setup indication.

In order to implement the message address stack whose operation has been described hereabove, the existing PNNI message contents may be amended to include two additional Information Elements preferably as described in the table and accompanying footnotes which immediately follow. The column labels and table abbreviations are as previously described.

| Information Element | Reference | Type | Length |
|---|---|---|---|
| Broadband repeat indicator | 6.4.5.13 | O[13] | 4–5 |
| Transported Number | | O[14] | (15) |

[13]This Information Element may be used even if there is only one Transported Number List or DTL Information Element. When the Broadband repeat indicator Information Element immediately precedes the Transported Number or DTL Information Element, it indicates the order of Information Elements in the stack.
[14]Included by the source node if the received setup indication contains this information or if the source node is performing address mapping of the original Called and/or Calling Party Numbers.
[15]Minimum and maximum lengths depend on the numbering plan.

A message address stack can be assembled by utilizing a plurality of Transported Number Information Elements as described above, one for each message address that is to be encapsulated in the PNNI Call SETUP message. Each Transported Number Information Element may preferably have the following structure and contents:

| 8 | 7 | 6 | 5 | 4 | 3 | 2 | 1 | Octet/Octet Group |
|---|---|---|---|---|---|---|---|---|
| Transported Number | | | | | | | | 1 |
| x | x | x | x | x | x | x | x | |
| Information Element identifier | | | | | | | | |
| 1 ext | Coding Standard | | IE Instruction Field | | | | | 2 |
| Length of Transported Number contents | | | | | | | | 3 |
| Length of Transported Number contents (continued) | | | | | | | | 4 |
| 0 | 0 | 0 | 0 | 0 | 0 | 0 | 1 | |
| Transported Called Party Number indicator | | | | | | | | 5.1 |
| Length of Transported Called Party Number | | | | | | | | 5.2 |
| Length of Transported Called Party Number (continued) | | | | | | | | 5.3 |
| Transported Called Party Number | | | | | | | | 5.4[16] |
| 0 | 0 | 0 | 0 | 0 | 0 | 1 | 0 | |
| Transported Calling Party Number indicator | | | | | | | | 6.1 |
| Length of Transported Calling Party Number | | | | | | | | 6.2 |
| Length of Transported Calling Party Number (continued) | | | | | | | | 6.3 |
| Transported Calling Party Number | | | | | | | | 6.4[16] |

Note 16 - At least one of the Transported Called Party Number or the Transported Calling Party Number fields must be present in the Transported Number IE. Both may be present in the Transported Number IE.

In the immediately preceding table, the Coding Standard bits 7 and 6 of Octet 2 of the Information Element are each set to the value of 1, pursuant to current ATM Forum specific standards known to those skilled in this art. As well, the Transported Called Party Number of Octet 5.4 of the Transported Number Information Element corresponds to Octets 5 and 6 of the Called Party Number as defined in Section 4.5.12 of ITU-T Recommendation Q.2931, entitled "B-ISDN Application Protocols for Access Signalling" and dated February 1995. The Transported Calling Party Number of Octet 6.4 of the Transported Number IE corresponds to Octets 5 and 6 of the Calling Party Number as defined in Section 4.5.13 of the same ITU specification.

Figure 2A:
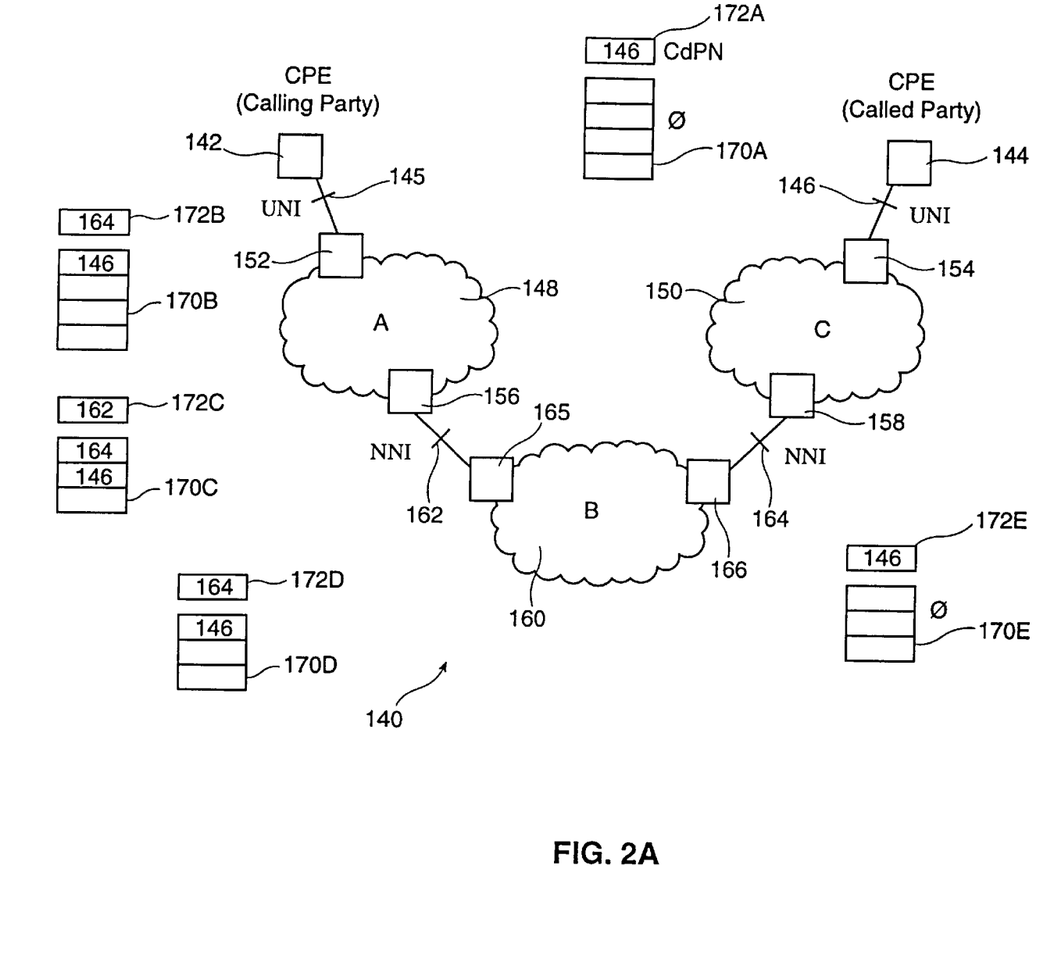
FIG. 2A is a schematic representation of a second ATM networking environment showing the operations of stacking and unstacking of message addresses at network nodes utilizing the transported message address stack according to another preferred embodiment of the present invention.

With reference to FIG. 2A, there is shown another ATM network environment 140 which comprises an originating network entity 142 consisting of a calling party having customer premise equipment (CPE). The networking environment 140 also comprises a destination network entity 144 consisting of a called party having customer premise equipment (CPE). The CPEs 142, 144 are each connected via respective UNI compliant interfaces 145, 146 to respective ATM networks such as the networks 148, 150 (labelled A and C).

In the example provided by FIG. 2A, the originating network entity 142 and the terminating network entity 144 are not associated with respective terminal originating and terminal destination addresses which are both selected from a common addressing space. In the direction of message propagation, Network A provides ingress node 152 for connection to the UNI interface 145, whereas Network C provides egress node 154 for like connection from its corresponding UNI interface 146. The Networks A and C respectively provide egress node 156 and ingress node 158 for connection to network 160 (labelled B) via NNI interfaces 162, 164. In the direction of message propagation, ingress node 165 of Network B is connected to NNI interface 162, which in turn is connected to egress node 156 of Network A. Egress node 166 of Network B is connected to NNI interface 164, which in turn is connected to ingress node 158 of Network C.

The intermediate network entities, namely the ATM networks A, B and C are connected successively between originating network entity 142 and terminating network entity 144. At least two contiguous network entities of the connection oriented network entities which comprise the network environment 140 are each associated with addressing spaces through which the message is not routable by way of either of the terminal addresses associated with the originating and terminating network entities if those addresses are used as a party number for routing a message.

In the case of the networking environment 140, the Networks A and B are associated with addressing spaces through which the terminal destination address of the terminating network entity 144 are not routable. As well, in this example, the Networks A and B have addressing spaces through which the message is not otherwise routable by way of any other single address. In other words, in order to traverse the Networks A and B, separate replacement addresses for the terminal destination address of the terminating network entity 144 must be used in each of these two networks.

Network B of the networking environment 140 is a network which does not provide the functionality of the method according to the present invention which has been previously described. Thus, any operations concerning a transported message address stack take place within network nodes found in the Networks A and C. Thus, at the initiation of a call by the calling party at CPE 142 to the called party at CPE 144, the called party address stack 170A is empty. The Called Party Number 172A is represented by the external destination address for CPE 144 of the called party as the Called Party Number which, as explained previously, is unroutable to the Networks A and B. This external destination address will correspond to the network address for UNI link 146 of Network C.

At the network border between CPE 142 and Network A, for instance at ingress node 152 of Network A, an address routing table will map the external destination address for UNI link 146 of Network C to that of an intermediate destination address or local address corresponding to NNI link 164 between Networks B and C. This mapping is required because the external UNI link 146 of Network C is not routable over Network A. At this point in the progression of the call, the original Called Party Number is assigned to the called party address stack, as at 170B. The intermediate destination address for NNI link 164 is assigned to the Called Party Number, as at 172B.

Since addresses of the Network B are not routable over the Network A, the ingress node 152 will be configured to further map the external destination address for UNI link 164 of Network B to that of another intermediate destination address corresponding to NNI link 162 between Networks A and B. The Called Party Number at 172B is next pushed onto the called party address stack, as at 170C. The intermediate destination address corresponding to NNI link 162 is assigned to the Called Party Number, as at 172C. The call proceeds through Network A to its egress node 156.

Egress node 156 will be configured to promote the last-in element of the called party address stack upon receiving the address for NNI link 162 between Networks A and B as the Called Party Number 172C. The intermediate destination address corresponding to NNI link 164 will therefore be assigned from the stack as the Called Party Number 172D. The Called Party Number 172C is thus overwritten or discarded. Since this address 172D is routable over Network B, the call will be routed through Network B to egress node 166 and NNI link 164.

When the call progresses to ingress node 158 of Network C, this node will be configured to pop the address stack upon receiving the address for NNI link 164 between Networks B and C. As before, the last-in element of the stack will be promoted as the Called Party Number, as at 172E. This Called Party Number 172E corresponds to the address associated with UNI interface 146. Since this address is routable over Network C, the call will progress through Network C and on to CPE 144, the called party.

In the example portrayed above by networking environment 140, it will be noted that the network nodes 165 and 166 of Network B were not required to read, process or manipulate addresses which were transported by means of the message address stack. Rather, all such operations were configured to occur at the egress node 156 of the preceding network entity and the ingress node 158 of the succeeding network entity. These nodes were configured in this manner so as to accommodate the fact that Network B does not provide the functionality for conducting operations related to the message address stack.

Figure 2B:
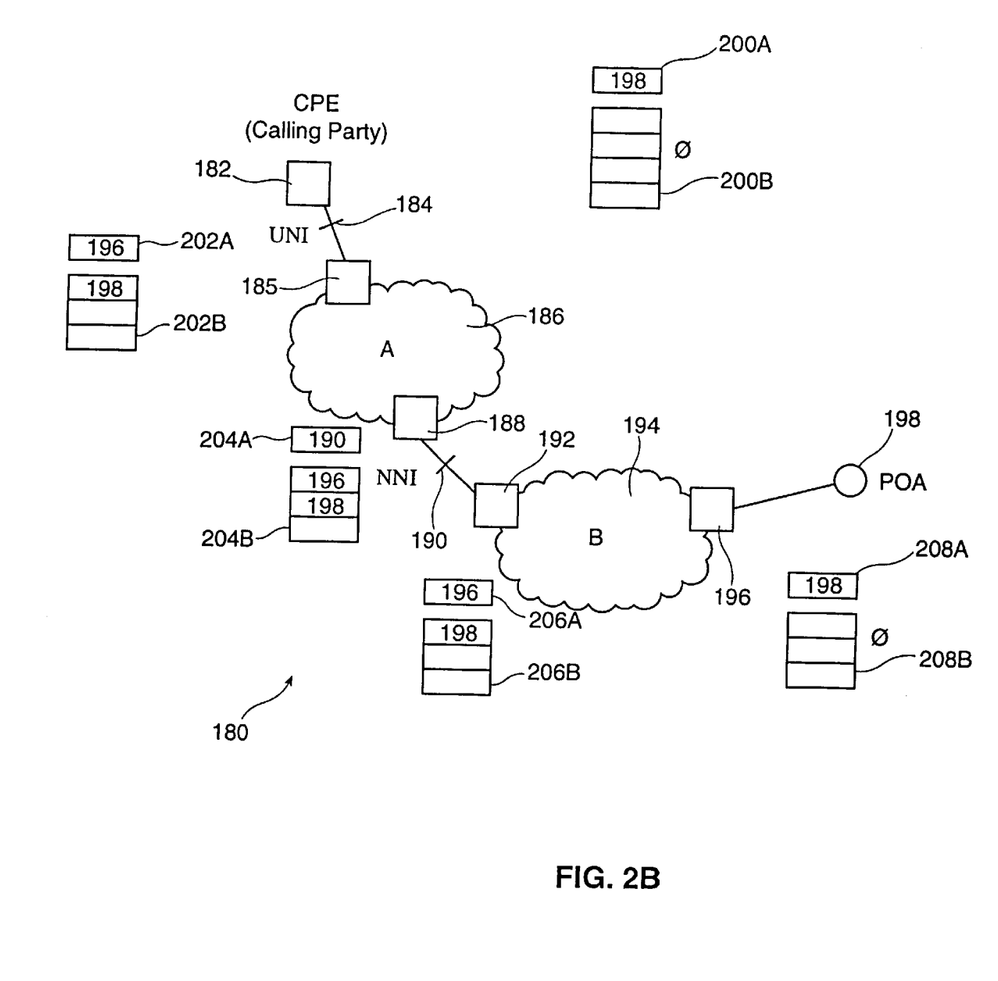
FIG. 2B is a schematic representation of a third ATM networking environment showing the operations of stacking and unstacking of message addresses at network nodes utilizing the transported message address stack according to yet another preferred embodiment of the present invention.

Turning to FIG. 2B, there is shown yet another ATM networking environment 180 which comprises an originating network entity 182 consisting of a calling party having a CPE. The networking environment 180 also comprises a destination network entity 198 consisting of a point of attachment (POA) for a mobile device (not shown). The CPE 182 and POA 198 are connected to respective ATM networks such as the networks 186, 194 (labelled A and B). In the case of CPE 182, the connection to Network A is by means of a UNI compliant interface 184.

The originating network entity 182 and the terminating network entity 198 are not associated with respective terminal originating and terminal destination addresses which are both selected from a common addressing space. At the initiation of a call by the calling party at CPE 182 to the called mobile party attached at POA 198, the called party address stack 200A is empty. The Called Party Number 200B is represented by the external destination address for POA 198 as the Called Party Number.

The intermediate Networks A and B are each associated with addressing spaces through which the message is not routable by way of the terminal destination address associated with POA 198. As well, the Networks A and B have addressing spaces through which the message is not otherwise routable by way of any other single address. As in the previous example, in order to traverse the Networks A and B, separate replacement addresses for the terminal destination address of the POA 198 must be used in each of these two networks.

At call initiation, the terminal destination address corresponding to POA 198 will be assigned as the Called Party Number 200A. The called party message address stack will be empty, as at 200B. Since this address is unroutable within Network A, its ingress node 185 will be configured to push the address of POA 198 onto the stack, as at 202B. A lookup will be performed to obtain a new address, namely that corresponding to egress node 196 of the Network B. This address will be assigned as the new Called Party Number 202A. Since this address is also not routable within Network A, a further mapping will be performed by ingress node 185. The Called Party Number 202A will be pushed onto the message address stack, as at 204B. The address corresponding to NNI link 190 between Networks A and B will be assigned as the new Called Party Number, as at 204A. The call thus proceeds through Network A.

In the example of networking environment 180, the ingress node 192 of Network B is configured to pop the message address stack upon receiving Called Party Number 204A with a value corresponding to NNI link 190. The last-in element of the message address stack is promoted as the new Called Party Number 206A. The call proceeds through Network B to its egress node 196. Egress node 196 is configured to pop the address stack upon receiving Called Party Number 206A, thereby promoting the address associated with POA 198 as the new Called Party Number 208A.

The address stack 208B is thereby emptied and the call proceeds to POA 198.

Figure 3:
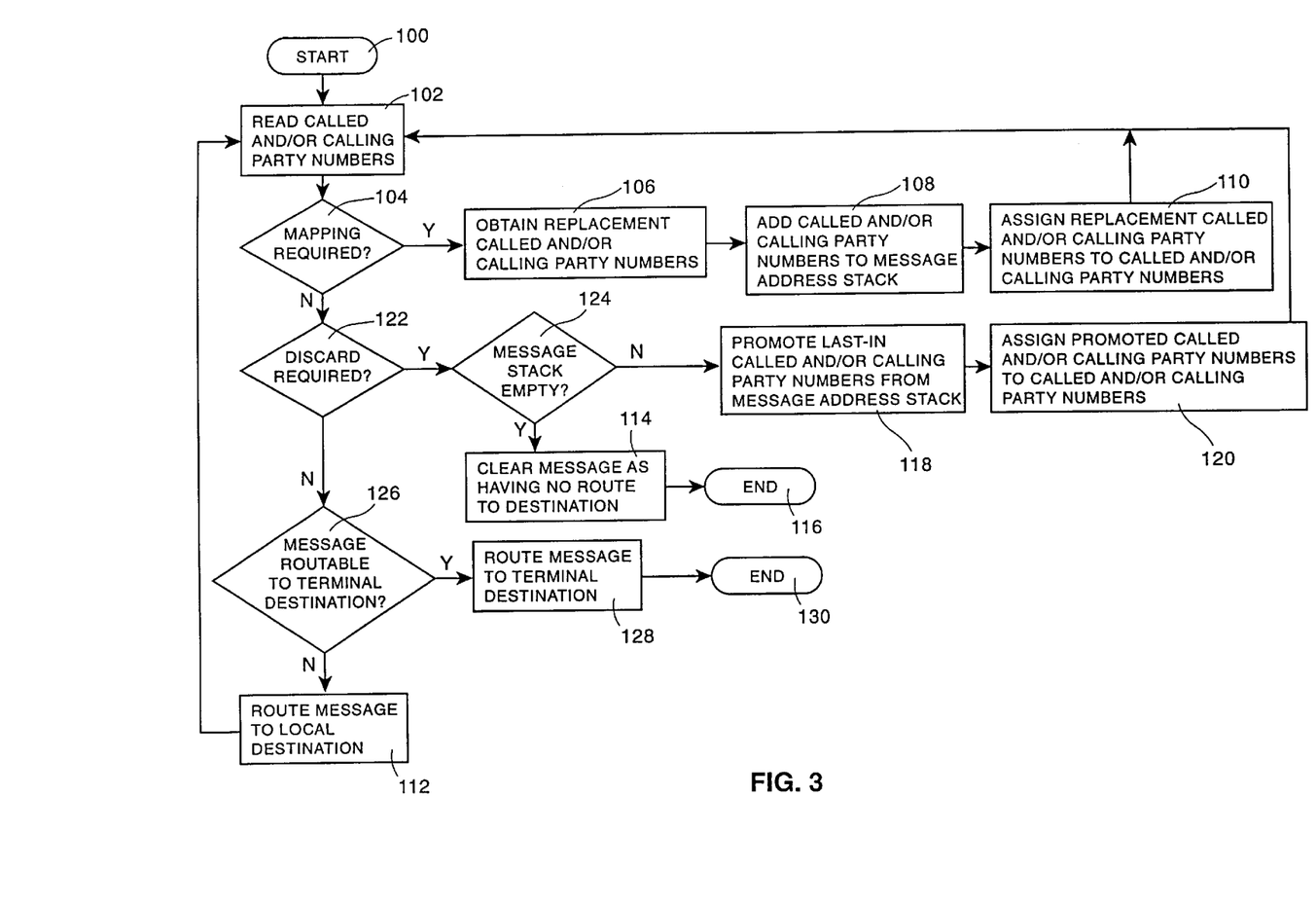
FIG. 3 is a flowchart denoting the steps of a method of signalling a message utilizing the transported message address stack according to the present invention.

The preferred procedures for address stacking, stack propagation and address unstacking are next described with reference to FIG. 3. The message address stack according to the present invention is preferably implemented as a set of the previously described Transported Number Information Elements that are structured in a push-on, pop-off stack. The procedures for address stacking, address transport and address unstacking begin at block 100 when a message arrives at a network border, for instance at the ingress network node of a succeeding network. The Called Party Number and Calling Party Numbers are read at block 102 from the Called Party Number IE and Calling Party Number IE from the received message contents, in a manner well known to those skilled in this art. At block 104, it is determined whether or not these current addresses require mapping. If so, the addresses are mapped by the ingress node at block 106 to new replacement called and calling party numbers more suitable for routing or other functions as deemed fit by the individual network or implementation. The mapping function itself is well known to those skilled in this art. The method proceeds once again to block 102 to read the replacement Called and/or Calling Party Numbers to determine at step 104 whether further mapping is required. If so, new replacement Called and/or Calling Party Numbers will be obtained and the existing Called and/or Calling Party Numbers will be pushed onto their appropriate address stacks.

In the case of a PNNI network, the ingress node in question will be the DTL originator node of the PNNI domain. Each DTL originator node in a PNNI message path may determine by local means that the Called Party Number and/or Calling Party Numbers are to be respectively mapped to another Called Party Number and/or Calling Party Number to be carried transparently through the intermediate PNNI network. This determination is made by node configuration and routing means well known to those skilled in this art.

By way of example, the DTL originator node may be preconfigured to map to new addresses upon its receipt of a message associated with a predetermined Called Party Number. If so, the new addresses may be obtained from an address database such as a lookup table. If a DTL originator node determines that such mapping is to be performed at block 104, the procedures which follow are executed. First, a new Transported Number IE is created. The Called and Calling Party Numbers received from the preceding network are inserted into the newly created Transported Number IE at block 108 for transparent transport through the PNNI network. The new Transported Number IE is pushed onto the message address stack on top of any existing Transported Number IE is received from the preceding network. Next, the newly derived Called and Calling Party Numbers which are obtained from the mapping process of block 106 previously described are respectively placed into the Called and Calling Party Number IE is at block 110 and the former is used as the local target of path computation. Where the replacement Called Party Number IE indicates the point of local transport termination, in most cases a new Called Party Number will be required upon the message arriving at its local target. In addition to the foregoing operations, a DTL is created normally by the DTL originator node of the PNNI network and is followed by all intermediate switches of the network domain, as per the existing PNNI specification.

If at block 104 it is determined that address mapping is not required, then a further determination is made at block 122 as to whether or not the received message addresses are to be discarded and replaced with new message addresses. If so, the message address stack is polled for a stored address in the form of a Transported Number IE. If, as at 124, the message address stack is not empty, then the last-in Called and Calling Party Numbers are promoted from the message stack at block 118. Namely, the top Transported Number IE is removed from the message address stack. In the preferred structure and contents of the message address stack described above, the Transported Number IE must contain either one of two fields pertaining respectively to a Called Party Number and a Calling Party Number. As well, the Transported Number IE may contain both such fields. If there is a Called Party Number field in the popped element of the Transported Number Stack, it is placed into the Called Party Number IE at block 120. If no such Called Party Number field is found in the popped element, the Called Party Number received from the preceding network is not disturbed. If there exists a Calling Party Number field in the popped element of the Transported Number Stack, it is likewise placed in the Calling Party Number IE and otherwise, the received Calling Party Number is not disturbed. After promotion of a last-in Called and/or Calling Party Number, the method reverts to step 102 to determine whether a further discard is required at step 122. If so, the foregoing discard process is repeated to promote another Called and/or Calling Party Number from the appropriate address stacks.

If it is determined at block 104 that the received message addresses are not to be discarded, a further query is made at block 126 to determine whether the message is routable to its terminal destination. If so, the message is routed to the terminal destination at block 128 and the signalling process is successfully completed at block 130. If not, the message is routed to its local destination as at block 112. The message is progressed as determined by the local address space depending on the meaning of the incoming Called Party Number. For example, the incoming Called Party Number may identify a local port over which the call is to be progressed. When the message arrives at the network border with the next succeeding network, for instance at the egress network node of the immediately traversed network, the Called and Calling Party Numbers are again read at block 102 and the foregoing procedures are repeated. In the case of a PNNI network, the egress network node will be the DTL terminator node of the PNNI domain.

A message being signalled within the local address space of an intermediate PNNI network will be routed following the DTL as per procedures well known to those skilled in this art. The Transported Number IE's which contain the transported addresses are forwarded transparently to the succeeding node in the local address space. However, once the call message arrives at the DTL terminator of the local address space, the scope of the Called Party Number and the connectivity thereof are verified as per normal PNNI procedures.

If the message address does not contain a Transported Number IE as determined at block 124, then the call message is cleared at block 114 with a cause code set to a value of 3. As will be appreciated by those skilled in this art, this signifies that the call has no route to its destination and the signalling of the message is ended unsuccessfully as at block 116.

Figure 4:
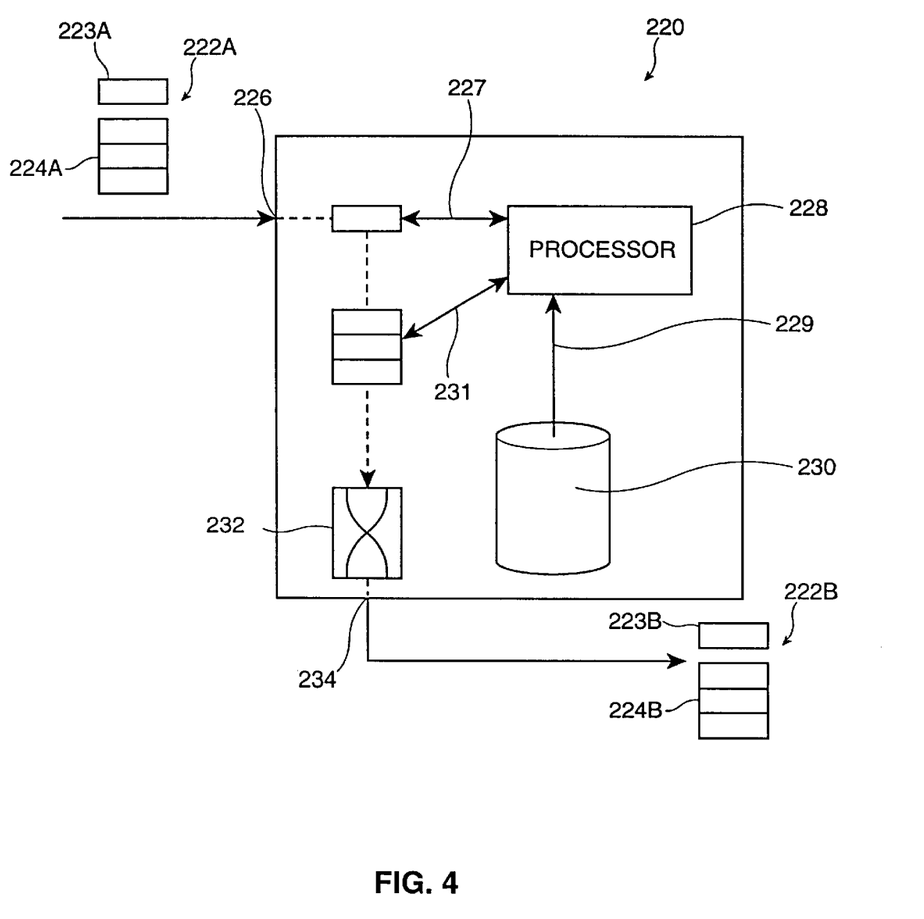
FIG. 4 is a schematic representation of a network switch which processes a network message according to the method of the present invention.

With reference to FIG. 4, there is shown a schematic representation of a network switch 220 pursuant to which the method of signalling a message according to the present invention may be implemented. For instance, the network switch 220 may be implemented as any of the network nodes 24, 35, 41 and 43 of the networking environment 10 (FIG. 1), or the network nodes 152, 156 and 158 of the networking environment 140 (FIG. 2A) or the network nodes 185, 192 and 196 of the networking environment 180 (FIG. 2B).

A network message 222A is received at the input port 226 of the network switch 220. As previously explained, the message 222A includes a party number 223A according to which the message is routed and a message address stack 224A within which at least two addresses may be stored. Means for reading the party number 223A is provided. Such means is preferably a processor 228 or the like, which may be implemented in various ways. For instance, the processor 228 may be implemented in hardware in the form of a dedicated circuit or in software which is executed on a microprocessor or by way of a combination of such hardware and software, as will be known to those skilled in this art.

Once the party number has been read as at 227, the processor determines whether or not the party number is to be stored and replaced with a new party number. If so, the processor consults an address database or lookup table 230 as at 229 in order to obtain a replacement address for the party number. The party number is pushed onto the message address stack as at 231 by storing the party number within the stack so as to permit its subsequent retrieval according to a last-in and first-out precedence. The replacement address is thereafter assigned to the party number as at 227. As discussed above, the replacement address for the party number may itself be read by the processor 228 as at 227 in order to determine whether further address mapping is to be performed with the last assigned party number. If so, another lookup is made of the address table 230 as at 229, and a further push onto the message address stack is made as at 231 with the last assigned party number. The newly generated replacement address is then assigned as the party number, as at 227. Such multiple pushes onto the address stack were illustrated previously with reference to the network node 152 of the networking environment 140 (FIG. 2A) and the network node 185 of the networking environment 180 (FIG. 2B).

Upon reading the party number, the network switch may also be configured to determine whether the party number is to be discarded and replaced with an address stored within the message address stack. If so, the message address stack is popped as at 231 by promoting the last-in element thereof, and this promoted element is thereafter assigned to the new party number as at 227. Stack popping as described herein was illustrated previously with reference to the network nodes 41 and 26 of networking environment 10 (FIG. 1), 156 and 158 of networking environment 140 (FIG. 2A), and 192 and 196 of networking environment 140 (FIG. 2B). As with the stack pushing operation described in the previous paragraph, the network switch 220 may be configured to perform multiple stack popping. Thus, the last assigned party number after a stack popping operation may itself be read by the processor 228 as at 227 to determine whether the last assigned party number is to be again discarded and replaced with the last-in address found on the address stack. Moreover, the network switch 220 may be configured to perform both address pushing and address popping operations with the message address stack. For instance, the switch may be configured to first determine whether the party number requires discard and replacement with an address from the stack, and to then determine whether the address promoted from the stack as the party number requires mapping to a replacement address obtained from the table 230.

Once the various pushing and popping operations have been performed by the network switch 220, the message 222B is routed according to the party number 223B together with its message address stack 224B, each of which contains addresses which have resulted from those operations. The message 222B progresses through the switch fabric 232, whereupon the message is transmitted from the switch over an appropriate output port 234.

While a single processor has been described above as constituting the means for reading the party numbers of received messages, for transacting with the message address stack and for consulting the address database or lookup table, these operations may be performed by individual processors acting in combination, if so desired. As well, while the address database or lookup table 230 has been described as being implemented within the network switch 220, those skilled in this art will understand that a database or table which is accessed externally of the network switch may also be used according to the present invention.

The signalling method described above includes the mapping of Calling Party Numbers as well as Called Party Numbers. Those skilled in this art will appreciate that the method may be employed to stack, transport and unstack addresses which pertain only to a called party, to both a called party and a calling party, or only to a calling party. Those skilled in this art will also understand that the present invention has been described by way of example only, and that various modifications of detail may be made thereto, all of which come within the spirit and scope thereof.

What is claimed is:

1. A method of signalling a message across a plurality of connection oriented network entities, the network entities including an originating network entity, a terminating network entity and at least two of a plurality of intermediate network entities connected successively therebetween, the originating network entity and the terminating network entity each respectively being associated with a terminal address, the terminal address of the originating network entity being a terminal originating address and the terminal address of the terminating network entity being a terminal destination address, at least two contiguous network entities of the connection oriented network entities each being associated with addressing spaces through which the message is not routable by one of said terminal addresses when same is used as a party number for routing the message and through which the message is not otherwise routable by way of a single address, the message being initiated from the terminal originating address associated with the originating network entity and routed through the intermediate network entities to be received at the terminal destination address associated with the terminating network entity, the method of signalling comprising the steps of:

(a) storing said unroutable terminal address as a party number;

(b) routing the message according to the party number from the originating network entity through each succeeding and contiguous intermediate network entity, if any, which provides an addressing space through which the message is routable;

(c) at every network border between any two contiguous network entities wherein an immediately succeeding network entity does not provide an addressing space through which the message is routable, determining whether the party number is to be stored and replaced with a new party number and, if so, then storing the party number so as to permit its subsequent retrieval according to a last-in and first-out precedence to thereby create a stored party number and, once the party number has been stored as aforesaid, assigning a replacement address as the party number;

(d) at every network border between any two contiguous network entities wherein an immediately succeeding network entity does not provide an addressing space through which the message is routable, determining whether the party number is to be discarded and replaced with a stored party number and, if so, assigning the last-in stored party number as the party number;

(e) following steps (c) and (d), routing the message according to the party number and transporting, with the message, every stored party number through the immediately succeeding intermediate network entity and through each further succeeding and contiguous intermediate network entity, if any, through which the message is routable; and (f) repeating steps (c), (d) and (e) until such time as the message is routable to the terminating network according to the party number.

2. The method of signalling according to claim 1, wherein each stored party number is assigned to a last-in first-out (LIFO) message address stack.

3. The method of signalling according to claim 2, wherein the said message address stack is encapsulated within the message being signalled to enable transport of every stored party number with the message.

4. The method of signalling according to claim 3, wherein the party number is an address field within the message being signalled.

5. The method of signalling according to claim 4, wherein the terminal address is the terminal destination address and party number is a called party number.

6. The method of signalling according to claim 5, wherein the replacement address is a local terminal address that is of routing significance to the intermediate network entity which immediately succeeds the border.

7. The method of signalling according to claim 6, wherein the stored party number is of routing significance to the intermediate network entity which immediately succeeds the border.

8. The method of signalling according to claim 4, wherein the terminal address is the terminal originating address and the party number is a calling party number.

9. The method of signalling according to claim 7, wherein at least one of the connection oriented network entities is an Asynchronous Transfer Mode (ATM) network.

10. The method of signalling according to claim 9, wherein the step of determining whether the called party number is to be stored and replaced with a new called party number is performed at an egress network node of the intermediate network entity which immediately precedes the border.

11. The method of signalling according to claim 9, wherein the step of determining whether the called party number is to be stored and replaced with a new called party number is performed at an ingress network node of the intermediate network entity which immediately succeeds the border.

12. The method of signalling according to claim 9, wherein the step of determining whether the called party number is to be discarded and replaced with a stored called party number is performed at an ingress network node of the intermediate network entity which immediately succeeds the border.

13. The method of signalling according to claim 9, wherein the step of determining whether the called party number is to be discarded and replaced with a stored called party number is performed at an egress network node of the intermediate network entity which immediately precedes the border.

14. The method of signalling according to claim 7, including the further step of determining whether the replacement address is to be stored and replaced with another new party number following step (c) and, if so, then storing the replacement address so as to permit its subsequent retrieval according to a last-in first-out precedence to thereby create a stored party number and, once the replacement address has been stored as aforesaid, assigning a further replacement address as the party number and repeating the said further step until such time as it is determined that the further replacement address need not be stored and replaced with another new party number.

15. The method of signalling according to claim 7, including the further step of determining whether the last-in stored party number assigned as the party number is to be discarded and replaced with a new stored party number following step (d) and, if so, assigning a next last-in stored party number as the party number and repeating said further step until such time as it is determined that the next last-in stored party number need not be discarded and replaced with a new stored party number.

16. The method of signalling according to claim 11, wherein the step of determining whether the called party number is to be stored and replaced with a new called party number is accomplished by preconfiguring the ingress network node to perform such step for every received message associated with a predetermined called party number.

17. The method of signalling according to claim 16, wherein the new called party number is obtained from an address database.

18. The method of signalling according to claim 13, wherein the step of determining whether the called party number is to be discarded and replaced with a stored called party number is accomplished by preconfiguring the egress network node to perform such step for every received message associated with a predetermined called party number.

19. The method of signalling according to claim 7, wherein the connection oriented networks operate pursuant to a signalling protocol selected from the group consisting of: PNNI, Frame Relay, NISDN, ITU Standard Q.2931, AINI and BISUP signalling protocols.

20. The method of signalling according to claim 5, further comprising the steps of:

(i) storing the terminal originating address as a calling party number prior to routing the message in step (b);

(ii) where it is determined in step (c) at said network border that the called party number is to be stored and replaced, storing the calling party number in addition to storing the called party number as aforesaid so as to permit subsequent retrieval of the calling party number according to a last-in first out precedence to thereby create a stored calling party number and, once the calling party number has been stored as aforesaid, assigning a replacement address as the calling party number; and (iii) where it is determined in step (d) at said network border that the called party number is to be discarded and replaced, assigning the last-in stored calling party number as the calling party number in addition to assigning the last-in stored called party number as the called party number.

21. The method of signalling according to claim 5, wherein at least two of the connection oriented network entities are networks associated with address spaces through which the message is not routable as a result of the address spaces not being topologically significant to each other.

22. The method of signalling according to claim 9, wherein the message is a call establishment request message.

23. A method of signalling a message across a plurality of connection-oriented network entities, the network entities including an originating network entity, a terminating network entity and a plurality of intermediate network entities connected successively therebetween, the originating network entity and the terminating network entity each respectively being associated with a terminal originating address and a terminal destination address which are both selected from a common addressing space, at least two of the intermediate network entities each being associated with addressing spaces that are not topologically significant with each other and that are not topologically significant with the common addressing space from which the terminal originating and terminal destination addresses are selected, the message being initiated from the terminal originating address associated with the originating network entity and routed through the plurality of intermediate network entities to be received at the terminal destination address associated with the terminating network entity, the method of signalling comprising the steps of:

(a) storing the terminal destination address as a called party number;

(b) routing the message according to the called party number from the originating network entity through each succeeding and contiguous intermediate network entity, if any, which shares a topologically significant addressing space with the originating network entity;

(c) at every network border between any two contiguous network entities which do not share a topologically significant addressing space with each other, determining whether the called party number is to be stored and replaced with a new called party number that is of routing significance to the intermediate network entity which immediately succeeds the border and, if so, then storing the called party number so as to permit its subsequent retrieval according to a last-in and first-out precedence to thereby create a stored called party number and, once the called party number has been stored as aforesaid, assigning a local address as the called party number for progressing the message through the immediately succeeding intermediate network entity;

(d) at every border between any two contiguous network entities which do not share a topologically significant addressing space with each other, determining whether the called party number is to be discarded and replaced with a stored called party number, wherein the stored called party number is of routing significance to the intermediate network entity which immediately succeeds the border and, if so, assigning the last-in stored called party number as the called party number for progressing the message through the immediately succeeding intermediate network entity;

(e) followings steps (c) and (d), routing the message according to the called party number and transporting, with the message, every stored called party number through the immediately succeeding intermediate network entity and through each further succeeding and contiguous intermediate network entity, if any, which shares a topologically significant addressing space with the immediately succeeding intermediate network entity; and (f) repeating steps (c), (d) and (e) until such time as the message is routable to the terminating network entity according to the called party number.

24. A method of signalling a message across a plurality of connection oriented network entities, the network entities including an originating network entity, a terminating network entity and a plurality of intermediate network entities connected successively therebetween, the originating network entity and the terminating network entity each respectively being associated with a terminal originating address and a terminal destination address which are both selected from a common addressing space, at least two of the intermediate network entities each being associated with addressing spaces that are not topologically significant with each other and that are not topologically significant with the common addressing space from which the terminal originating and terminal destination addresses are selected, the message being initiated from the terminal originating address associated with the originating network entity and routed through the plurality of intermediate network entities to be received at the terminal destination address associated with the terminating network entity, the method of signalling comprising the steps of:

(a) storing the terminal destination address as a called party number;

(b) storing the terminal originating address as a calling party number;

(c) routing the message according to the called party number from the originating network entity through each succeeding and contiguous intermediate network entity, if any, which shares a topologically significant addressing space with the originating network entity;

(d) at every network border between any two contiguous network entities which do not share a topologically significant addressing space with each other, determining whether the called party number is to be stored and replaced with a new called party number that is of routing significance to the intermediate network entity which immediately succeeds the border and, if so, then storing the called party number and the calling party number so as to permit their subsequent retrieval according to a last-in and first-out precedence to thereby respectively create a stored called party number and a stored calling party number and, once the called party number and the calling party number have been stored as aforesaid, assigning a first local address as the called party number for progressing the message through the immediately succeeding intermediate network entity and assigning a second local address as the calling party number;

(e) at every border between any two contiguous network entities which do not share a topologically significant addressing space with each other, determining whether the called party number is to be discarded and replaced with a stored called party number, wherein the stored called party number is of routing significance to the intermediate network entity which immediately succeeds the border and, if so, assigning the last-in stored called party number as the called party number for progressing the message through the immediately succeeding intermediate network entity and assigning the last-in stored calling party number as the calling party number;

(f) following steps (d) and (e), routing the message according to the called party number and transporting, with the message, every stored called party number and every stored calling party number through the immediately succeeding intermediate network entity and through each further succeeding and contiguous intermediate entity, if any, which shares a topologically significant addressing space with the immediately succeeding intermediate network entity; and (g) repeating steps (d), (e) and (f) until such time as the message is routable to the terminating network entity according to the called party number.

25. A method for processing a network message associated with a party number according to which the network message is routed and having a message address stack within which at least two addresses may be stored, the method comprising the steps of:

(a) reading the party number associated with the network message;

(b) determining whether the party number is to be stored and replaced with a new party number and, if so, then storing the party number within the message address stack to permit its subsequent retrieval according to a last-in and first-out precedence to thereby create a stored party number and, once the party number has been stored as aforesaid, assigning a replacement address as the party number; and (c) following step (b), routing the message according to the party number.

26. The method of processing a network message according to claim 25, wherein the message address stack is encapsulated within the network message to enable transport of every stored party number with the network message.

27. The method of processing a network message according to claim 25, wherein the party number is an address field within the network message.

28. The method of processing a network message according to claim 27, wherein the replacement address is a local terminal address that is of routing significance to an immediately succeeding network entity.

29. The method of processing a network message according to claim 28, wherein the network message is associated with an Asynchronous Transfer Mode (AIM) network.

30. The method of processing a network message according to claim 28, wherein the message is processed by a signalling protocol selected from the group consisting of: PNNI, Frame Relay, NISDN, ITU Standard Q.2931, AINI and BISUP signalling protocols.

31. The method of processing a network message according to claim 30, wherein the replacement address is retrieved from an address database.

32. The method of processing a network message according to claim 31, wherein the step of determining whether the party number is to be stored and replaced with a new party number is performed at an ingress network node of an immediately succeeding network entity.

33. A method for processing a network message associated with a party number according to which the message is routed and having a message address stack within which at least two addresses may be stored and retrieved according to a last-in and first-out precedence, the method comprising the steps of:

(a) reading the party number associated with the network message;

(b) determining whether the party number is to be discarded and replaced with an address stored within the message address stack and, if so, assigning a last-in stored party number of the message address stack as the party number; and (c) following step (b), routing the network message according to the party number.

34. The method of processing a network message according to claim 33, wherein the message address stack is encapsulated within the network message to enable transport of every stored party number with the message.

35. The method of processing a network message according to claim 33, wherein the party number is an address field within the network message.

36. The method of processing a network message according to claim 35, wherein the last-in stored party number is of routing significance to the immediately succeeding network entity.

37. The method of processing a network message according to claim 36, wherein the network message is associated with an Asynchronous Transfer Mode (ATM) network.

38. The method of processing a network message according to claim 36, wherein the message is processed by a signalling protocol selected from the group consisting of: PNNL Frame Relay, NISDN, ITU Standard Q.2931, AINI and BISUP signalling protocols.

39. The method of processing a network message according to claim 38, wherein the step of determining whether the party number is to be discarded and replaced with a stored number is performed at an ingress network node of an immediately succeeding network entity.

40. The method of processing a network message according to claim 39, wherein the step of determining whether the party number is to be discarded and replaced with a stored number is performed at an egress network node of an immediately succeeding network entity.

41. A network switch for processing a network message associated with a party number according to which the message is routed and having a message address stack within which at least two addresses may be stored and retrieved according to a last-in and first-out precedence, the network switch comprising:

(a) means for reading the party number associated with the network message;

(b) means for determining whether the party number is to be stored and replaced with a new party number;

(c) means for storing the party number within the message address stack to permit its subsequent retrieval according to a last-in and first-out precedence to thereby create a stored party number;

(d) means for assigning a replacement address as the party number; and (e) means for routing the message according to the party number once said replacement address has been so assigned.

42. A network switch for processing a network message associated with a party number according to which the message is routed and having a message address stack within which at least two addresses may be stored and retrieved according to a last-in and first-out precedence, the network switch comprising:

(a) means for reading the party number associated with the network message;

(b) means for determining whether the party number is to be discarded and replaced with an address stored within the message address stack;

(c) means for assigning a last-in stored party number of the message address stack as the party number; and (d) means for routing the message according to the party number once said last-in stored party number has been so assigned as the party number.

* * * * *